United States Patent

Angelucci et al.

[15] 3,696,229

[45] Oct. 3, 1972

[54] BONDING TOOL FOR THROUGH THE TOOL OBSERVATION BONDING AND METHOD OF BONDING

[72] Inventors: Thomas L. Angelucci, 89 Charlaan Circle, Cherry Hill, N.J. 08034; Frederick W. Kulicke, Jr., 3840 Oak Road, Philadelphia, Pa. 19132

[22] Filed: April 14, 1970

[21] Appl. No.: 28,338

[52] U.S. Cl. ....................219/85, 29/626

[51] Int. Cl. ....................B23k 1/04

[58] Field of Search .......219/85, 125; 228/4; 29/407, 29/467, 628, 626

[56] References Cited

UNITED STATES PATENTS

| | | | |
|---|---|---|---|
| 3,529,117 | 9/1970 | Costello | 219/85 |
| 3,374,531 | 3/1968 | Bruce | 219/85 X |
| 3,486,223 | 12/1969 | Butera | 29/626 |
| 3,520,055 | 7/1970 | Jannett | 29/628 |
| 3,083,291 | 3/1963 | Soffa et al. | 219/85 X |
| 3,271,555 | 9/1966 | Hirchon et al. | 219/85 |
| 3,275,795 | 9/1966 | Bosna et al. | 219/125 |
| 3,331,119 | 7/1967 | Gingell et al. | 219/407 |
| 3,464,102 | 9/1967 | Soloff | 228/1 X |
| 3,522,407 | 8/1970 | Costello | 219/85 |

*Primary Examiner*—J. V. Truhe
*Assistant Examiner*—L. A. Schutzman
*Attorney*—John B. Sowell

[57] ABSTRACT

A tool for selecting, picking up and/or bonding semiconductor devices to a substrate or carrier, said tool having a bonding wedge which has a central observation window permitting the operator or scanner to simultaneously observe the bonding tool, the connection points on the semiconductor device and the conductors on the substrate or carrier to which the connection points are attached.

13 Claims, 12 Drawing Figures

INVENTORS.
THOMAS L. ANGELUCCI
FREDERICK W. KULICKE, JR
BY
John B. Sowell
ATTORNEY.

PATENTED OCT 3 1972 3,696,229

SHEET 2 OF 2

INVENTORS.
THOMAS L. ANGELUCCI
FREDERICK W. KULICKE, JR
BY

John B. Sowell

ATTORNEY.

BONDING TOOL FOR THROUGH THE TOOL OBSERVATION BONDING AND METHOD OF BONDING

BACKGROUND OF THE INVENTION

The present invention constitutes an improvement in the tooling used for bonding leads or prefabricated conductors to connection points on substrates, carriers or semiconductor devices.

In the process of making semiconductor devices such as integrated circuits it was formerly necessary to perform a series of steps called wire bonding in order to electrically connect terminal points on the semiconductor device to the carrier (header, frame, substrate or lead pattern) to which the semiconductor is attached. In recent years several semiconductor devices have been designed to eliminate wire bonding. The first of these devices were referred to as flip-chip devices because the semiconductor devices were provided with raised connector pads adapted to be inverted face down and bonded to a pattern of electrical conductors. When the devices and substrate were opaque it was impossible to observe at the time of bonding whether the pads coincided with the pattern. Another such device is referred to as a beam lead semiconductor device because the semiconductor device is provided with electrical leads which extend outwardly from the device giving the appearance of a plurality of miniature cantilever beams. This device is also adapted to be inverted face down and the beam leads bonded to a pattern of electrical conductors.

In the process of picking up flip-chip or beam lead devices heretofore it has been necessary to position the devices in a prealignment station or to use optical systems which provide an image of the tool and an image of the device. Alignment of the images was indicative of the tool being aligned with the device. Such optical systems require that the tool and the device be substantially removed one from the other, requiring a long stroke of the tool to engage the device. Usually the tool and the device cannot be observed at the time of pick up in a manner which would aid in aligning the tool and the device.

Similarly, in the process of bonding flip-chip or beam lead devices to a substrate or carrier it has heretofore been difficult to observe the alignment of the pads or leads on the device with the conductors to which they were being attached.

SUMMARY OF THE INVENTION

The present invention overcomes the limitations of the prior art bonding tools by providing a tool having a central observation opening through the central axis of the tool. The opening is adapted to provide a field of view which is at least as large in area as the portion of the semiconductor device to be operated upon by the working face of the bonding tool. The scanner or operator views through the central opening of the tool and selects the device to be picked up or bonded. As the bonding tool is lowered to engage a beam lead device the inner perimeter of the working face is observed enabling the device to be centered in the aperture of the bonding tool. The inner perimeter or aperture is preferably larger than the active element portion of the beam lead device enabling the operator to see the pattern of conductors to which the beam leads are to be connected. The beam lead device is aligned in spaced coincidence with the pattern of conductors and bonded thereto while being observed by a scanner or operator.

These and other features, objects and advantages of the invention will be explained in connection with the following description of the details of a preferred construction and modifications thereof read in conjunction with the accompanying drawings.

DESCRIPTION OF THE PREFERRED EMBODIMENT

Figures 1, 2, 3, 4, 5, 6:
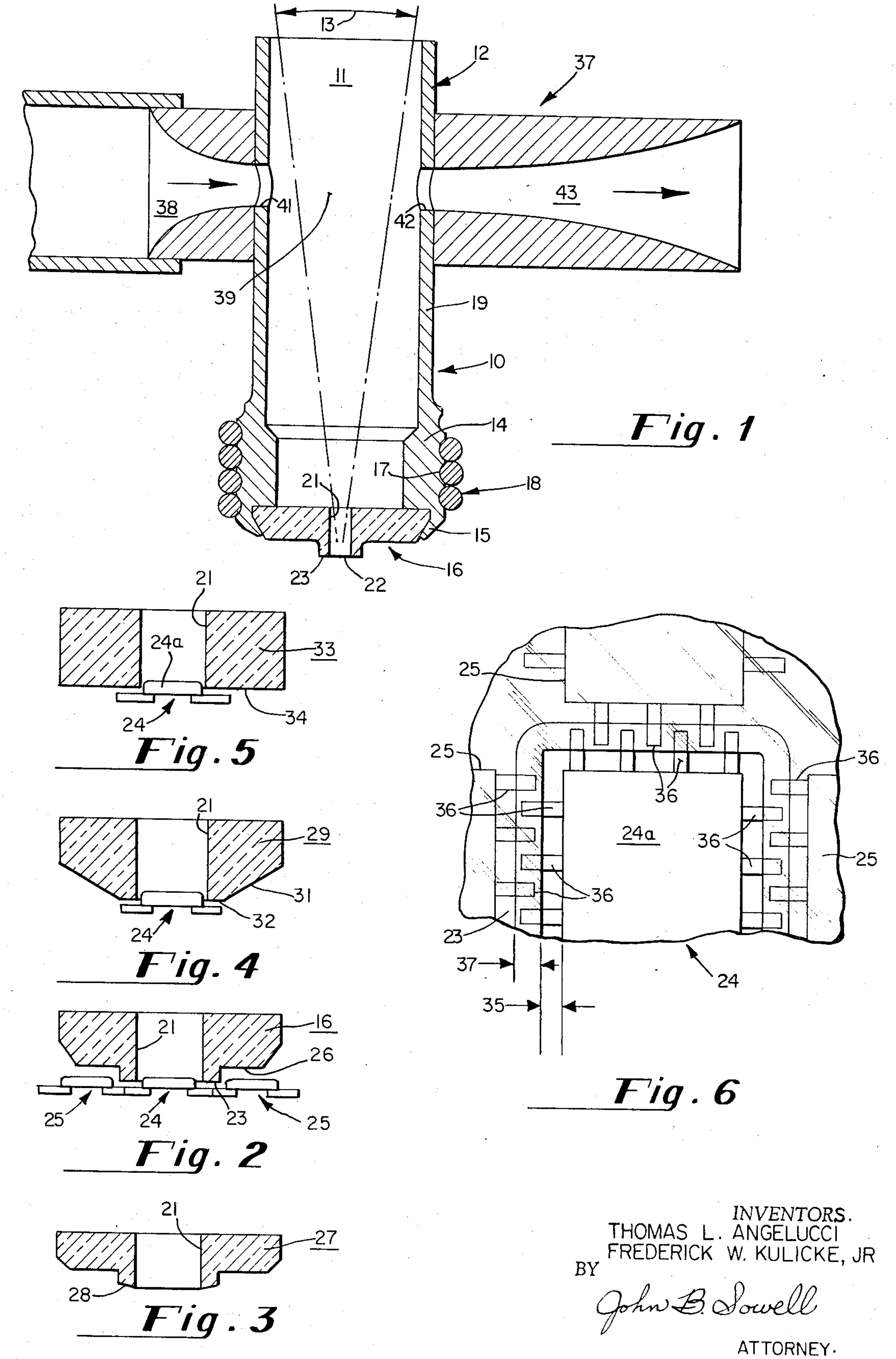
FIG. 1 is an elevation in section of a preferred embodiment to beam lead bonding tool.
FIG. 2 is an enlarged section of the bonding wedge shown in FIG. 1.
FIG. 3 is an enlarged section of a modified bonding wedge having a crowned or spherical shaped working face.
FIG. 4 is an enlarged section of another modified bonding wedge.
FIG. 5 is an enlarged section of a modified bonding wedge having a flat face.
FIG. 6 is an enlarged partial plan view showing an array of beam lead devices to be picked up.

FIG. 1 of the drawings shows a preferred embodiment bonding tool 10 having a central observation opening 11 through the body 12. The opening 11 is preferably large enough to permit the use of stereo optical scanners requiring a cone angle 13 of approximately 10°. If the opening is larger, a better view is obtained, and in the event it must be made smaller, monocular optical scanners may be employed. Body 12 at the lower end 14 has a crimped or swadged ring 15 to hold a transparent bonding wedge 16. The lower end 14 is provided with annular grooves 17 to accomodate a helical heating coil 18. The intermediate portion 19 of the body 12 is preferably a thin wall tube to provide isolation of the heat source. The bonding tool is intended to be operated at temperatures sufficient to thermocompression bond gold leads or conductors, accordingly, the transparent bonding wedge 16 is made of optically clear synthetic sapphire or heat resistant material and the lower end of the bonding tool is preferably made of metal having a compatible coefficient of thermal expansion such as Kovar.

Bonding wedge 16 has an aperture 21 therethrough, terminating at the lower tip or point 22 in a working face 23 extending outwardly from the perimeter of the aperture. The working face 23 may be made in several different shapes depending on the desired use. FIGS. 1 and 2 show a bonding wedge 16 having a working face 23 projecting downwardly away from the main body 16 which permits the tool 10 to pick up a device 24 out of an array of other devices 25. The relief ledge 26 is preferably far enough from the working face 23 that it will not touch raised areas or adjacent devices (not shown) on a substrate when a device like 24 is bonded thereto by wobbling the tool 10.

FIG. 3 shows a bonding wedge 27 similar to FIG. 2 having a spherical, crowned or radiused working face 28 extending upwardly and outwardly from the tip of the tool. A crowned working face 28 distributes the pressure of the bonding tool 10 uniformly over the leads being bonded when the tool is wobbled thus making more uniform individual bonds and avoiding the tendency of the device to creep or move due to the forged flow of metal when the leads are compressed.

FIG. 4 shows a bonding wedge 29 similar to FIGS. 1 to 3. Four relief ledges 31 taper upwardly and outwardly from the working face 32, permitting pick-up and bonding operations similar to the aforementioned wedges. There is a slight defraction of the field of view opposite ledges 31, however, the device 24 being below aperture 21 and face 32 is observed without defraction of the view.

FIG. 5 shows a bonding wedge 33 having a flat working face 34. A transparent wedge of this type is adapted to bond all leads simultaneously.

The preferred shape of aperture 21 in the bonding wedges is square or rectangular to conform to the usual shape of a semiconductor die 24*a*. Apertures 21 conforming to other shapes of dice could be made.

FIG. 6 shows a plan view looking down on a bonding wedge 16 of the type shown in FIGS. 1 and 2. The clearance 35 from the perimeter of the working face 23 of the wedge 16 to the edge of the die 24*a* is approximately half the length of a beam lead 36, and the width 37 of the working face 23 is slightly greater than half the length of a beam lead 36. Accordingly, the ends of the beam leads 36 terminate or end under the working face 23 so that no loose ends are left after the bonding operation. FIG. 6 illustrates part of the view seen by the scanner or operator looking down through the central observation opening 11 of bonding tool 10. When the working face 23 is correctly oriented over a device 24, the bonding tool is lowered and vacuum means are actuated to pick device 24 out of the array. It will be understood that the operator can see between the beam leads 36 and around the outside of the die 24*a*, thus, the device 24 held in the bonding tool 10 may be easily registered in coincidence with a conductive pattern on a substrate or a carrier and bonded thereto.

Vacuum means, shown in FIG. 1, comprise a venturi 37. Air entering inlet 38 passes through the throat 39 of the venturi which passes through opening 41,42 in the body 12 and out the outlet 43. The partial pressure created at the throat 39 is sufficient to pick up a device 24 at the working face 23 of wedge 16. Venturi 37 may serve as a means for mounting the bonding tool 10 to a bonding machine (not shown). The venturi vacuum means 37 may be mounted at the top of body 12 so that the throat 39 passes across the top of opening 11, or a simple vacuum line may be connected through the side of body 12.

Figures 7, 8:
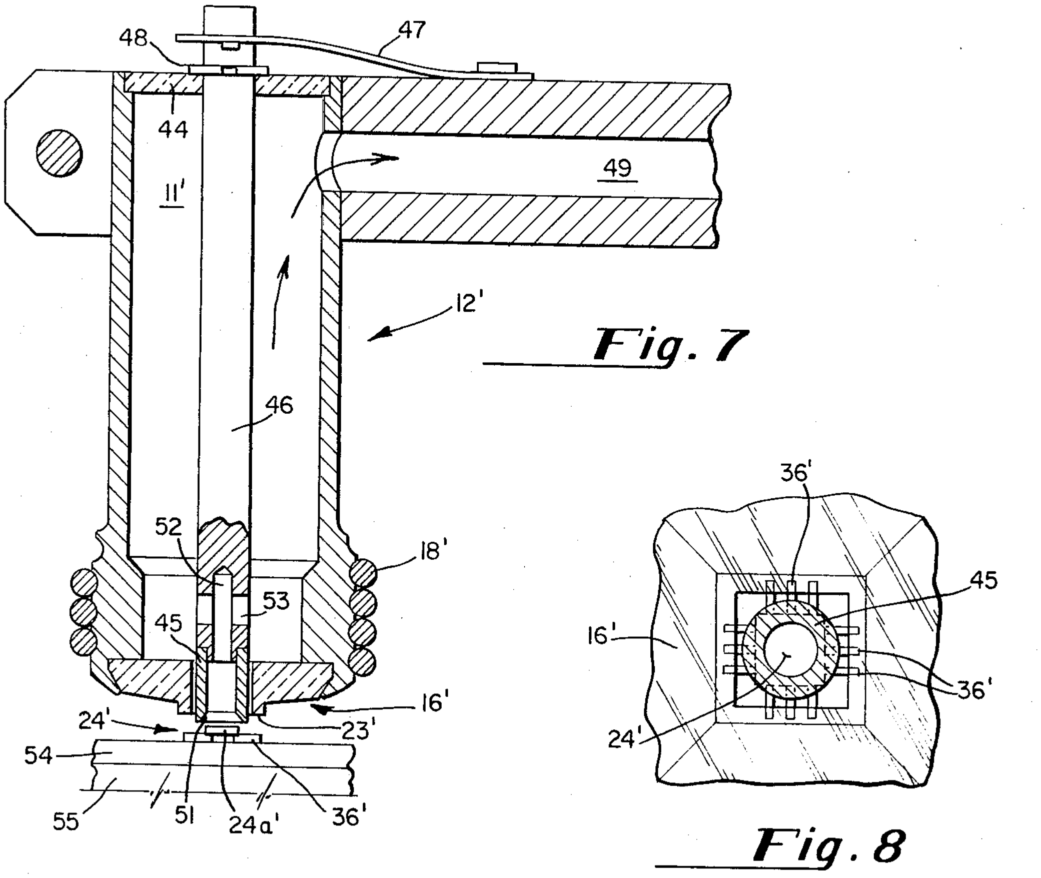
FIG. 7 is an enlarged elevation in section of modified embodiment beam lead bonding tool incorporating a pick-up collet.
FIG. 8 is a view of the tool of FIG. 7 looking at the end of the working face of the bonding wedge.

A modified embodiment bonding tool is shown in FIG. 7 having a body 12', a central observation opening 11', a heating coil 18' and a transparent bonding wedge 16'. The central observation opening 11' is preferably closed at the top with a cap 44. A pick-up collet 45 is connected to and supported by a shaft 46 which passes through transparent cap 44. A spring 47 urges the shaft 46 and connected collet 45 downwardly so that it projects past the working face 23' of bonding wedge 16'. A clip ring 48 or similar stop on shaft 46 may be employed to position the collet 45 relative to the bonding wedge 16'.

In a preferred mode of operation the bonding tool 10 is centered over a device 24' and lowered until the collet 45 engages the top of die 24*a'*. Vacuum is applied at vacuum mounting means 49 which is communicated to the pyramidal shaped recessed face 51 of collet 45 through cross drilled holes 52, 53 in shaft 46.

Spring 47 serves to restrain shaft 46 and collet 45 from rotating or being pulled into the tool body by the negative pressure during pick up of a device 24'. As already explained the device 24' may then be bonded to a substrate 54 on a support or anvil 55.

Figure 9:
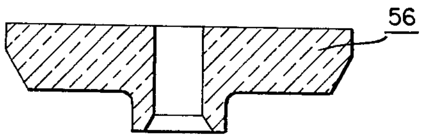
FIG. 9 is an enlarged elevation in section of a modified embodiment transparent collet.

FIG. 8 illustrates the view presented to an operator or scanner looking through a transparent bonding wedge 16' having an opaque collet 45. It will be noted a beam lead device 24' is easily located, picked up and bonded to a conductive pattern even though the die 24*a'* is not seen through collet 45. It is apparent from the foregoing discussion that a collet shaped like collet 45 or a collet 56 (FIG. 9) having a shape similar to a bonding wedge, may be made of a hard transparent material. Transparent collets may be mounted on bodies similar to body 12 for automatically locating, picking up and bonding a die without beam leads to a conductive pattern or used in conjunction with well-known bonding tools to automatically process beam lead semiconductor devices. In the latter event collet 45 is preferably suspended in a body or tool mount in a manner which leaves the top open to the field of view of an operator or a sensing device.

Figure 10:
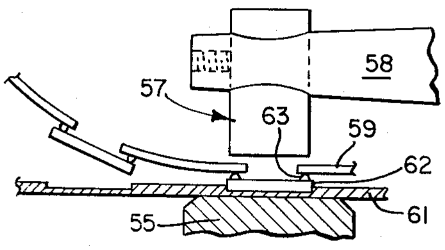
FIG. 10 is an enlarged section in elevation of a modified bonding wedge showing schematically the rapid assembly of flip-chip semiconductor devices to a coil or continuous lead frame.

To illustrate the principal, FIG. 10 shows a transparent bonding wedge or collet 57 held in a transducer or holder 58. A coil of lead frames 59 is positioned under the collet 57 and a transport belt 61 having a plurality of semiconductor devices 62 thereon is positioned in registration beneath the lead frame 59. Means are provided to align and position the working face of the bonding wedge 57 in coaxial alignment with the conductors of the lead frame 59 and the connectors 63 on the device 62. The transducer or holder 58 presses the device 62 against anvil 55, which may be heated, to bond the lead frame to the connectors.

Figure 11:
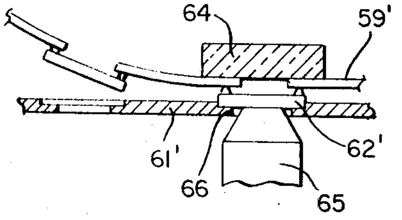
FIG. 11 is an enlarged section in elevation of the schematic system of FIG. 10 reversed.

FIG. 11 shows the mechanized assembly process in reverse. The shapes and functions of the bonding tool and anvil of FIG. 10 are substantially reversed. A transparent anvil 64 is placed over the lead frame 59' and semiconductor device 62'. The bonding tool 65 is inserted through an aperture 66 in the transport belt 61' to press the device 62' against anvil 64. Heat may be applied to the anvil or to the tool.

Figure 12:
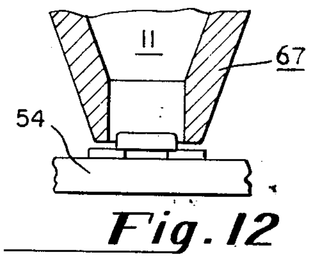
FIG. 12 is an enlarged elevation in section of the lower end of an opaque bonding wedge.

FIG. 12 illustrates an opaque bonding tool 67 having a central observation opening 11. In simplified bonding applications a tool of this type would be cheaper to make than a tool having a synthetic sapphire bonding wedge.

Having explained in detail the several operations of bonding tools which permit an operator or a sensing device to look through the tool at the parts to be picked up and/or bonded together, it should be understood that the tool may be kept in very close proximity to the work during both types of operations. This feature permits the bonding wedge, the device and the carrier to always be within the depth of field of the optical magnifying scanning system. The short working stroke of the bonding machine increases speed and accuracy of operation. Since the scanner is able to see the parts in spaced coincidence alignment, the operational steps are performed more rapidly and with a higher degree of accuracy than was attained heretofore.

We claim:

1. A bonding tool for attaching a plurality of preformed electrical connectors on a semiconductor device to a plurality of electrical conductors on a substrate or carrier, said bonding tool comprising: an elongated body, means on the body for mounting the bonding tool on a bonding machine, a central observation opening through the body which is larger than the semiconductor device to be bonded, said central observation opening in said elongated body having a transparent and non diffused field of view therethrough encompassing the area defined by the preformed electrical connectors on the semiconductor device, and a transparent bonding wedge having a substantially flat working face thereon mounted on the lower end of the body in the central observation opening for pressing said preformed electrical connectors into engagement with said electrical conductors to effect bonding attachment thereto while observing and aligning the connectors with the conductors through the central observation opening.

2. A bonding tool as set forth in claim 1 wherein said transparent bonding wedge is provided with a central aperture therein and said working face extends outwardly therefrom.

3. A bonding tool as set forth in claim 2 wherein said working face on said bonding wedge projects downwardly away from said bonding wedge to permit the tip of the bonding tool to pick up a device out of an array of a plurality of devices.

4. A bonding tool as set forth in claim 1 wherein said working face on said bonding wedge is crowned and tapers upwardly and outwardly from the tip end of the face.

5. A bonding tool as set forth in claim 1 which further includes vacuum means attached to the upper part of body.

6. A bonding tool as set forth in claim 5 wherein said vacuum means provides the means for mounting the bonding tool on a bonding machine.

7. A bonding tool as set forth in claim 5 wherein said bonding tool body has a vacuum access passageway in the top of the tool and a partial pressure is provided in the central observation opening by said vacuum device which comprises a venturi having its narrow throat section straddling said central observation opening.

8. A bonding tool as set forth in claim 6 wherein said central observation opening is closed at the top with a transparent cap.

9. A bonding tool as set forth in claim 2 which is further provided with a pick-up collet projecting downwardly from the central aperture of the transparent bonding wedge.

10. A bonding tool as set forth in claim 9 wherein said pick-up collet is connected to a shaft extending up into the center of the bonding tool body.

11. A bonding tool as set forth in claim 10 wherein said shaft is connected to said bonding tool body by resilient means urging the collet downward, and a stop is provided on said shaft to position the collet relative to the working face of the bonding wedge.

12. A bonding tool as set forth in claim 2 which further includes a heating coil on the outside of said body near the transparent bonding wedge.

13. A bonding tool for picking up and attaching a beam lead semiconductor device to a conductive pattern on a substrate or carrier, said tool comprising, an elongated body, a central observation opening through the length of the elongated body, said opening being substantially larger than the beam lead device to be picked up and bonded to the substrate, a transparent bonding wedge on the lower end of the elongated body, an aperture in said bonding wedge smaller than the device to be picked up and bonded to the substrate, a working face on said bonding wedge extending outwardly and downwardly from said aperture for engaging only the leads of the beam lead device, and means for connecting a negative pressure source to said bonding tool wereby a beam lead device is observed and aligned with the bonding wedge during pickup and the leads of the beam lead device are observed and aligned with the conductive pattern on the substrate during attachment.

* * * * *